(12) United States Patent
Vander Hoek

(10) Patent No.: US 9,027,392 B2
(45) Date of Patent: May 12, 2015

(54) MULTI-HOLE PROBES AND METHODS FOR MANUFACTURING MULTI-HOLE PROBES

(71) Applicant: Honeywell International Inc., Morristown, NJ (US)

(72) Inventor: Timothy Vander Hoek, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 200 days.

(21) Appl. No.: 13/888,955

(22) Filed: May 7, 2013

(65) Prior Publication Data

US 2014/0331750 A1 Nov. 13, 2014

(51) Int. Cl.
| | |
|---|---|
| *G01M 15/14* | (2006.01) |
| *G01L 13/00* | (2006.01) |
| *G01P 5/14* | (2006.01) |
| *G01P 13/02* | (2006.01) |
| *G01F 1/42* | (2006.01) |
| *G01M 9/06* | (2006.01) |

(52) U.S. Cl.
CPC ............... *G01M 15/14* (2013.01); *G01M 9/06* (2013.01); *G01L 13/00* (2013.01); *G01P 5/14* (2013.01); *G01P 13/025* (2013.01); *G01F 1/42* (2013.01)

(58) Field of Classification Search
USPC ........................................ 73/112.01, 754, 756
See application file for complete search history.

(56) References Cited

U.S. PATENT DOCUMENTS

| | | | |
|---|---|---|---|
| 3,677,079 A * | 7/1972 | Hoeflinger ...................... 73/147 |
| 3,699,811 A * | 10/1972 | Maiden et al. ............. 73/170.14 |
| 3,823,484 A * | 7/1974 | Dunn .............................. 33/560 |
| 4,733,975 A | 3/1988 | Komanetsky et al. |
| 4,833,917 A * | 5/1989 | Wilson ....................... 73/170.14 |
| 5,325,720 A | 7/1994 | Zuckerwar et al. |
| 5,423,209 A * | 6/1995 | Nakaya et al. .................. 73/182 |
| 5,929,331 A * | 7/1999 | Kinser et al. .................... 73/147 |
| 6,576,861 B2 | 6/2003 | Sampath et al. |
| 6,666,081 B1 * | 12/2003 | Babinsky et al. .......... 73/170.01 |
| 7,010,970 B2 | 3/2006 | Rediniotis et al. |

(Continued)

FOREIGN PATENT DOCUMENTS

| | | |
|---|---|---|
| DE | 102009057875 A1 | 6/2011 |
| EP | 0057069 A2 | 8/1982 |

(Continued)

OTHER PUBLICATIONS

Parker, M. A. et al.; Microstructural origin of giant magnetoresistance in a new sensor structure based on NiFe/Ag discontinuous multilayer thin films; Journal of Applied Physics, Volume: 75 , Issue: 10, pp. 6382-6384; Date of Publication: May 1994.

(Continued)

*Primary Examiner* — Freddie Kirkland, III
(74) *Attorney, Agent, or Firm* — Ingrassia Fisher & Lorenz, P.C.

(57) ABSTRACT

A multi-hole probe has a kernel that includes a forward surface that includes at least a first, second, and third pressure sensing ports. The multi-hole probe kernel further includes an upper surface, generally orthogonal to the forward surface, and including at least a first, second, and third stem ports. Still further, the multi-hole probe kernel includes first, second, and third tubes running between and providing a fluid connection with the first, second, and third pressure sensing ports and the first, second, and third stem ports, respectively.

20 Claims, 12 Drawing Sheets

(56) References Cited

U.S. PATENT DOCUMENTS

| | | |
|---|---|---|
| 7,073,386 B2 * | 7/2006 | Shinn ............................... 73/700 |
| 7,277,770 B2 | 10/2007 | Huang |
| 7,360,437 B2 | 4/2008 | Hardwicke et al. |
| 7,392,710 B1 * | 7/2008 | Ben-Mansour et al. ... 73/861.47 |
| 7,484,418 B1 * | 2/2009 | Kurtz ............................. 73/754 |
| 7,969,323 B2 | 6/2011 | Mitchell et al. |
| 8,069,732 B2 | 12/2011 | Kurtz |
| 8,141,429 B2 | 3/2012 | Guo |
| 8,590,388 B2 * | 11/2013 | Kurtz ............................. 73/754 |
| 2002/0121135 A1 | 9/2002 | Rediniotis et al. |
| 2005/0274178 A1 * | 12/2005 | Shin ........................... 73/170.14 |
| 2006/0018361 A1 | 1/2006 | Hardwicke et al. |
| 2009/0126499 A1 * | 5/2009 | Kurtz ............................. 73/754 |
| 2012/0048023 A1 | 3/2012 | Kurtz |
| 2012/0167659 A1 | 7/2012 | Besling et al. |
| 2014/0020480 A1 * | 1/2014 | Schmidt et al. ............ 73/861.71 |
| 2014/0123751 A1 * | 5/2014 | Lu .................................. 73/195 |

FOREIGN PATENT DOCUMENTS

| | | |
|---|---|---|
| FR | 2952713 A1 | 5/2011 |
| GB | 2452026 A | 2/2009 |
| WO | 2009143818 A1 | 12/2009 |

OTHER PUBLICATIONS

EP Search Report for Application No. 14165330.3 dated Jan. 7, 2015.

* cited by examiner

MULTI-HOLE PROBES AND METHODS FOR MANUFACTURING MULTI-HOLE PROBES

TECHNICAL FIELD

The present disclosure generally relates to sensing probes. More particularly, the present disclosure relates to multi-hole pressure/velocity/temperature sensing probes suitable for use in obtaining sensed measurements from an operating gas turbine engine or component rig.

BACKGROUND

In the design and testing of gas turbine engines, it is often desirable to take gas flow readings to obtain and/or validate data regarding the operation of the gas turbine engine or component rig. The so-called multi-hole pressure probe has been a standard technique for measuring mean flow angles, stagnation, and static pressures of the flow for over four decades. Generally, these probes make use of the known (through experiment or analysis) geometrical variation of all static pressure on fixed shapes (sphere, cylinder, wedge, etc.) which changes in a repeatable way as a function of that shape's orientation to the flow. Since the Mach number is a unique function of the ratio of stagnation to static pressure, it can also be derived from the pressures measured by such a probe. Up to two orthogonal flow angles as well as stagnation and static pressure can be deduced from pressures measured at four or five well-chosen locations on the probe (using five rather than four measurement locations generally improves the accuracy but requires a larger probe). Fewer measurements yield fewer flow variables. For example, if the probe size is a concern, then two measurements can be used to find either one flow angle or stagnation and static pressures. The static pressure ports on these steady state probes are usually connected to remote pressure transducers via long lengths of small diameter tubing.

The standard configuration for 3-D capable probes is a central hole surrounded by two pair of angled holes. These angled holes, which are configured to measure the pitch and yaw orthogonal angles, have classically been either a pyramid, sphere, or cone design or simply individual brazed tubes. Since there are only four independent quantities to be measured (two angles, speed and total pressure) it is possible to determine them with only four measurements of pressure (provided the four are independent). The advantages of a four-hole probe over a five-hole probe are that fewer measurements need to be made during operation and calibration of the probe.

To provide meaningful aerodynamic data in the context of measurements taken in an operating gas turbine engine or a component rig, multiple samples across a bladerow pitch (for example of a turbine or compressor section of the gas turbine engine) are preferred. This means the probe tip needs to measure less than about 0.100" in all dimensions for use in small-class gas turbine engines, such as those that may be implemented on helicopters, light aircraft, and the like. One of the main difficulties in producing a 3-D yaw/pitch-type probe in a tip of the small size noted above is placing the holes accurately on the face and providing independent pneumatic tubes for the pressure signals. Standard manufacturing techniques such as drilling or electrical discharge machining (EDM) cannot produce probes of this type and complexity.

Accordingly, it is desirable to have an improved multi-hole probe that is small enough to take adequate measurements in small-class gas turbine engines. It is further desirable to provide improved manufacturing techniques capable of producing such multi-hole probes. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Disclosed are multi-hole probes and methods of manufacturing the same.

In one embodiment, an exemplary multi-hole probe has a kernel that includes a forward surface that includes at least a first, second, and third pressure sensing ports. The first pressure sensing port includes a pitch angle of about −10° to about −45° and a yaw angle of about 0°. The second pressure sensing port includes a pitch angle of about 0° to about −10° and a yaw angle of about −35° to about −45°. The third pressure sensing port includes a pitch angle of about 0° to about −10° and a yaw angle of about +35° to about +45°. The first, second, and third pressure sensing ports are spaced apart from one another by a distance of greater than or equal to about 0.012 inches. The multi-hole probe kernel further includes an upper surface generally orthogonal to the forward surface and including at least a first, second, and third stem ports. The first, second, and third stem ports are spaced apart from one another by a distance of greater than or equal to about 0.012 inches. Still further, the multi-hole probe kernel includes first, second, and third tubes running between and providing a fluid connection with the first, second, and third pressure sensing ports and the first, second, and third stem ports, respectively. The first, second, and third tubes are contained fully within the kernel. The first, second, and third tubes are each configured to redirect a gas flow pressure signal from a first direction to a second direction that is approximately orthogonal to the first direction. The kernel is sized at less than or equal to about 0.10 inches across in a third direction that is approximately orthogonal to both the first and second directions.

In another embodiment, an exemplary method of manufacturing a multi-hole probe includes the step of providing a three-dimensional design for a probe kernel. The design for the probe kernel may be provided in accordance with the aforementioned exemplary probe kernel set forth in this Brief Summary. The method further includes providing the three-dimensional design to an additive manufacturing system and forming the kernel, based on the three-dimensional design, using the additive manufacturing system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The multi-hole probe of the present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third holes, simply denote different singles of a plurality unless specifically defined by language in the appended claims. All of the embodiments and implementations of the multi-hole probes described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Embodiments of the present disclosure provide a multi-hole probes that achieve an optimal "packing efficiency" for the internal pneumatic tubes, so as to allow the probe to be sized as small as possible. A spline was used to define the path from the face holes of the probe to the stem holes of the probe. To achieve the best path for these internal tubes, splines were defined using modern computer-aided design (CAD) techniques. The probe tip was also designed to require minimum additional machining steps to fabricate the complete probe. Countersunk holes are provided to easily insert the pneumatic tubes of the probe stem. The use of CAD also makes it quick and easy to make slight adjustments to the probe design to suit a specific application. The complicated internal structures of the probe tip are not producible with standard manufacturing techniques such as drilling or EDM. A new additive manufacturing (AM) technique for rapid prototyping called direct metal laser sintering or DMLS was used to produce the probe tip. The complicated internal and external shape required for the probe is produced accurately and inexpensively with DMLS.

Figure 1:
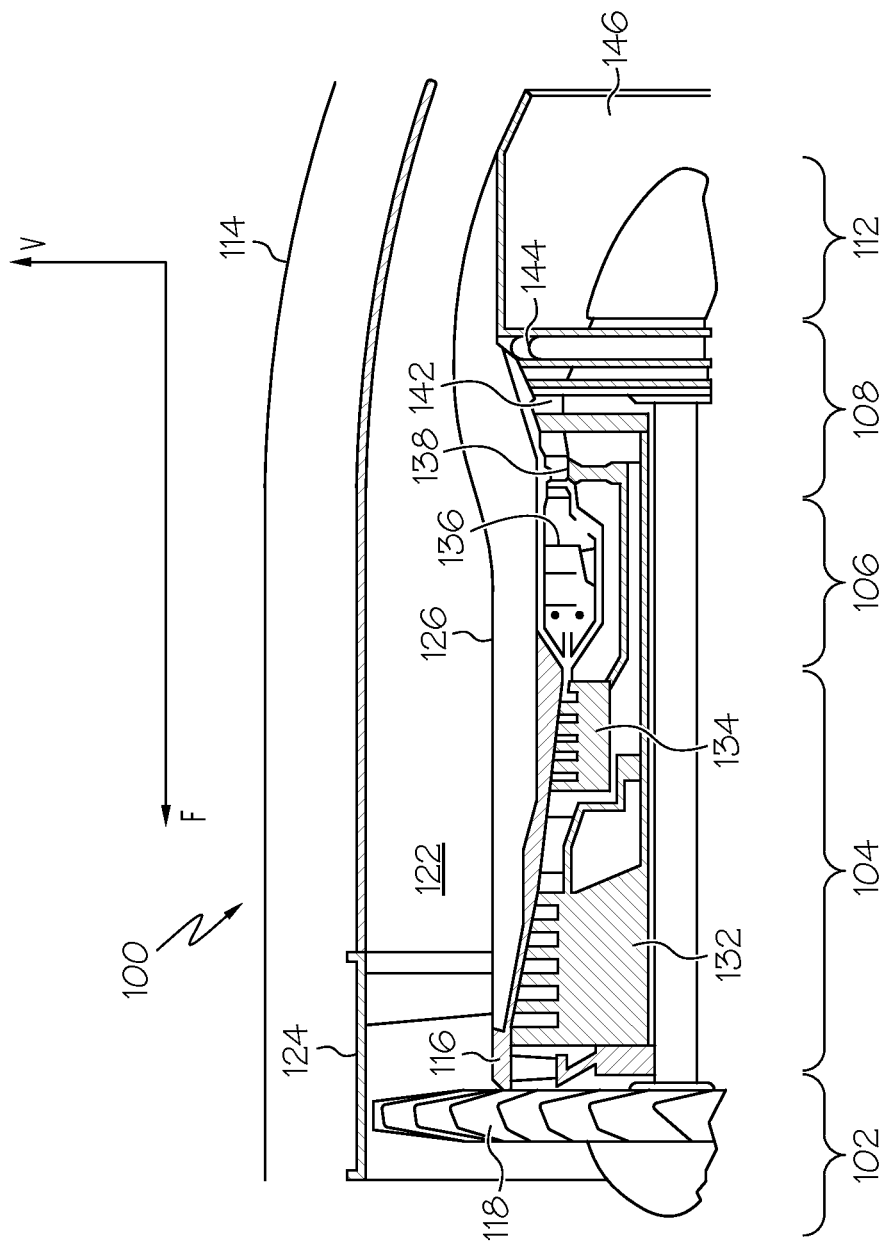
FIG. 1 depicts a simplified cross section view of a portion of an exemplary gas turbine engine known in the art.

Referring now particularly to FIG. 1, a simplified cross section view of an exemplary gas turbine engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct 124 that is spaced apart from and surrounds an inner fan duct 126. Most of the fan air that flows through the fan air bypass duct 122 is discharged from the bypass duct 122 to generate a forward thrust. The fraction of fan air that does not flow into the fan air bypass duct 122 is directed into the compressor section 104.

The compressor section 104 can include one or more compressors. The engine 100 depicted in FIG. 1 includes two compressors: an intermediate pressure compressor 132 and a high pressure compressor 134. No matter the number of compressors it includes, the air that is directed into the compressor section 104 is pressurized to a relatively high pressure. The relatively high pressure air that is discharged from the compressor section 104 is directed into the combustion section 106. The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines: a high pressure turbine 138, an intermediate pressure turbine 142, and a low pressure turbine 144, though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools.

During the design and testing of a gas turbine engine, such as depicted in FIG. 1, it is desirable to obtain gas flow velocity, pressure, and temperature data from one or more of the sections 102-112 shown in FIG. 1. To obtain such measurements, a sensing probe is inserted immediately downstream of the section from which measurements are desired, and the engine is operated. The flow data is sensed by the probe, and data is recorded. As noted above, for small-class engines, it is desirable to make the probe tip portion, wherein the gas flow enters the probe, as small as possible to enable as accurate measurements as possible. Thus, embodiments of the present disclosure are directed to probe tip designs, and methods for producing probe tips, in accordance with the foregoing long-felt need in the art.

Reference is now made to FIGS. 2-9, which depict in various views, an exemplary probe tip or "kernel" 200 in accordance with one embodiment of the present disclosure. The kernel 200 is attached to the probe "stem" portion (not shown), the end of which opposite the kernel 200 houses the pressure sensing equipment, such as one or more pressure transducers. Pressure is sensed by the probe through the kernel 200, which is in communication with the stem, which in turn is in communication with the pressure transducers for providing a measure of the pressure of the flow, from which the velocity and angle of the flow can be calculated. For purposes of reference in FIGS. 2-9, directional axis "F" is provided to indicate the general forward-facing orientation of the kernel 200 when placed in a flowing gas stream, and direction axis "V" is provided to indicate the general orientation of the stem (not shown) for sensing the pressure with the pressure transducers. Thus, as further shown in FIG. 1, directional axis "F" is provided in a direction that is parallel to, though opposite in direction to, the general direction of gas flow in gas turbine engine 100, and directional axis "V" can be any direction that is orthogonal to directional axis "F", as may be required to access the flow paths within the operating engine 100 (or component rig).

With reference now to the design and configuration of the exemplary multi-hole probe kernel 200 illustrated in FIGS. 2-9, the kernel 200 is provided having a forward surface 201, an aft surface 202, first and second lateral surfaces 203 and 204, upper surface 205, and lower surface 206. It will be appreciated that the terms forward/aft/lateral/upper/lower are provided herein for purposes of illustration, and are not intended to be limiting of the use or application of the multi-hole probe. Further, as the kernel 200 generally has curved surfaces, the exact boundary between the various surfaces 201-206 need not be sharply defined, but rather are provided for purposes of illustration.

Figure 2:
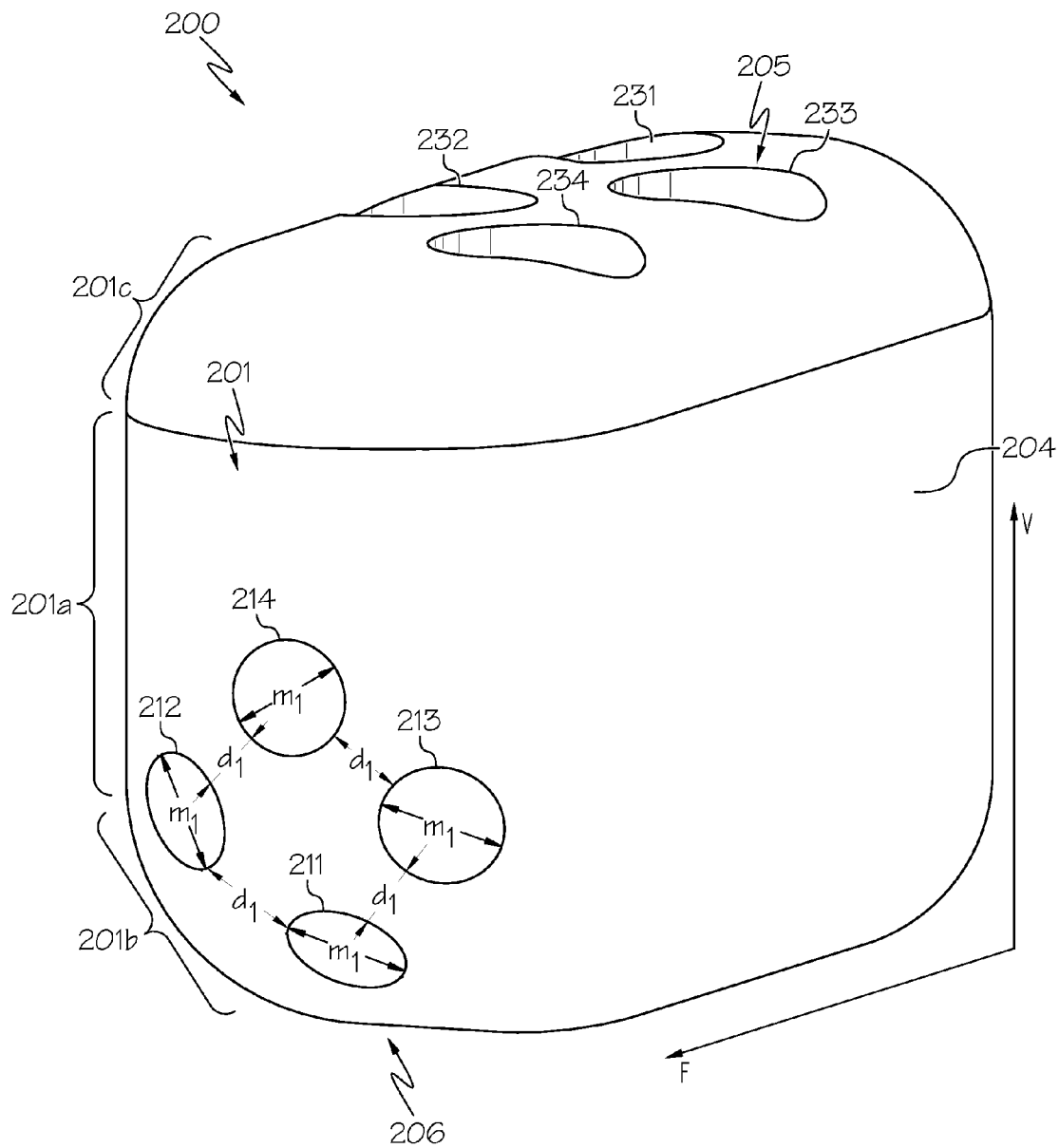
FIGS. 2-9 depicts various views of a multi-hole probe in accordance with an exemplary embodiment of the present disclosure.
Figure 4:
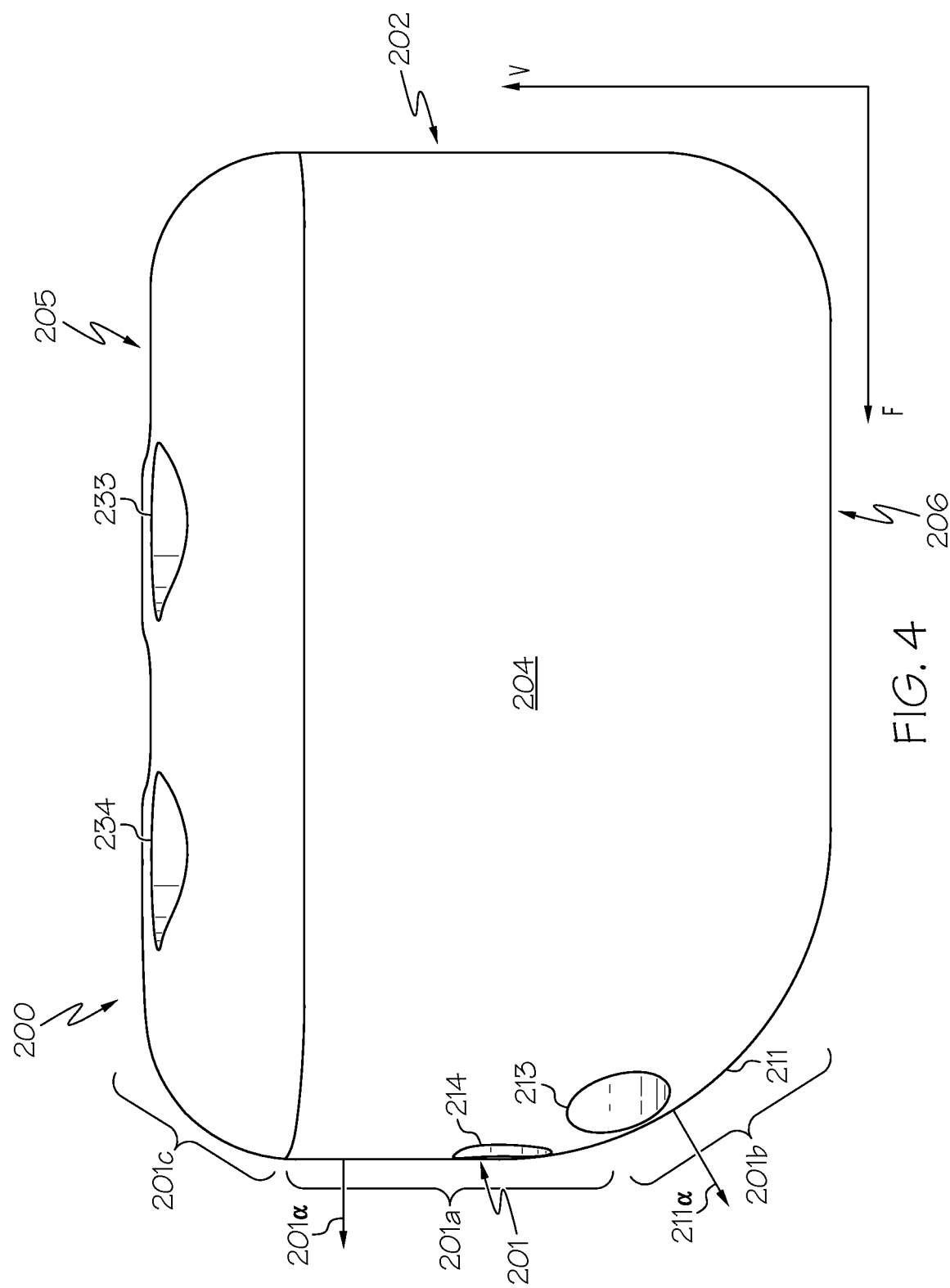

As shown best in FIGS. 2 and 4, front surface 201 generally includes a first portion 201a that is oriented generally parallel with respect to the "V" directional axis, a second portion 201b that is generally curved with respect to such axis, and a third portion 201c that is also generally curved with respect to such axis. Curved portions 201b and 201c may generally be regarded as "transition" regions between the forward surface 201 and the lower surface 206, and the forward surface 201 and the upper surface 205, respectively.

Provided in second portion 201b is a first pressure sensing port 211, which is formed as an opening within second portion 201b. Pressure sensing port 211 provides a fluid connection with first pressure sensing tube 221, which is formed wholly within kernel 200. As pressure sensing port 211 is within second portion 201b, the normal vector 211α defined thereby with respect to the surface thereat is provided at an angle with respect to the normal vector 201α defined by first surface portion 201a. In some examples, the angle that normal vector 211α deviates from normal vector 201α with respect to the "V" directional axis, hereinafter referred to as the "pitch" angle of normal vector 211α (or the pitch angle of pressure sensing port 211), is provided between about −10° and about −45°, and is preferably between about −20° and −35°. (The term "pitch angle" is well-known to those having ordinary skill in the art, and the definition thereof provided herein is intended to be commensurate with such understanding). It is further noted that although the ports shown in the Figures are generally circular, it will be appreciated that various non-circular cross-sections (oval, ovoid, elliptical, etc.) may be employed in connection with similarly cross-sectioned internal pressure sensing tubes for better packing efficiency, as will be described in greater detail below.

Figure 8:
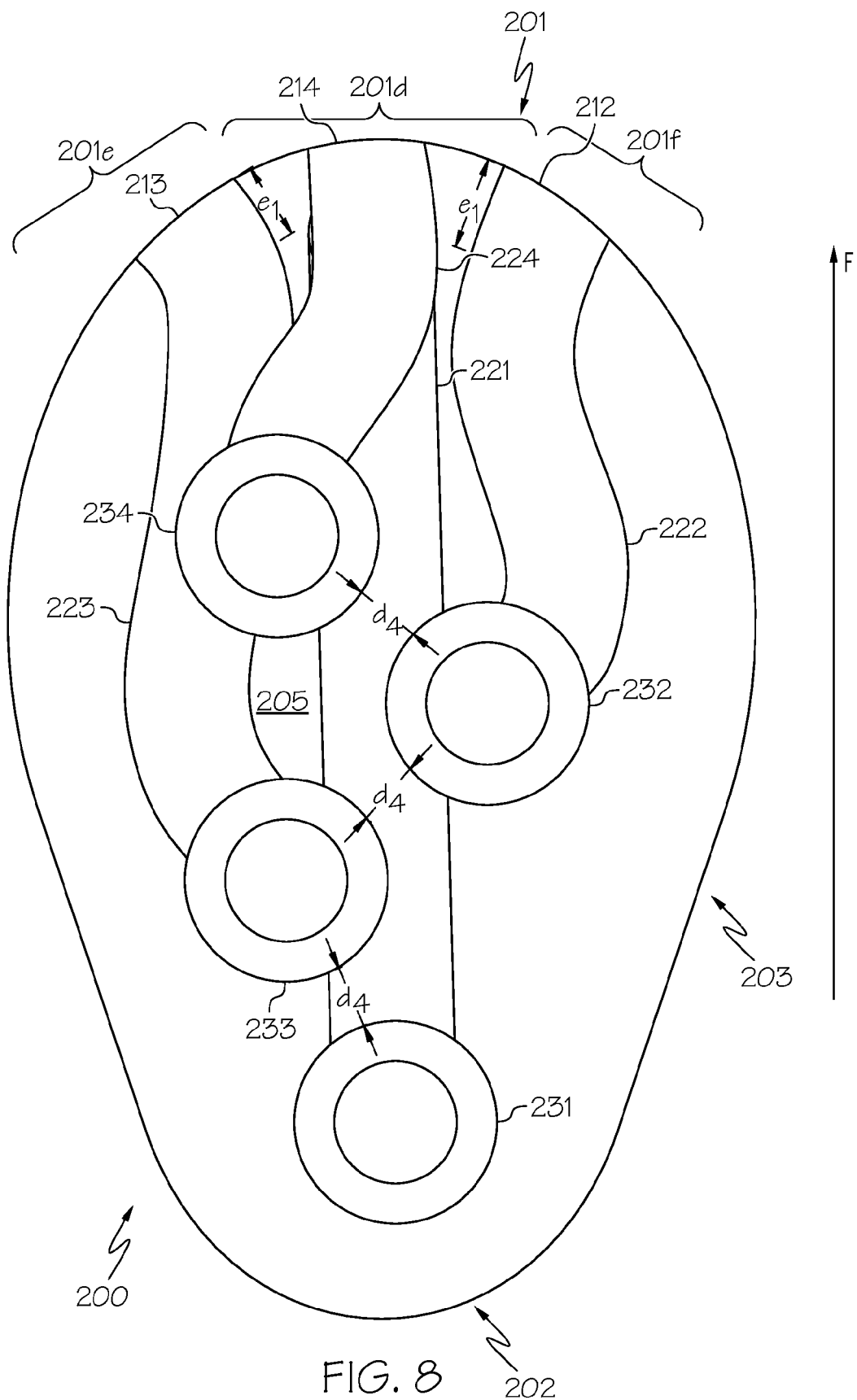
Figure 9:
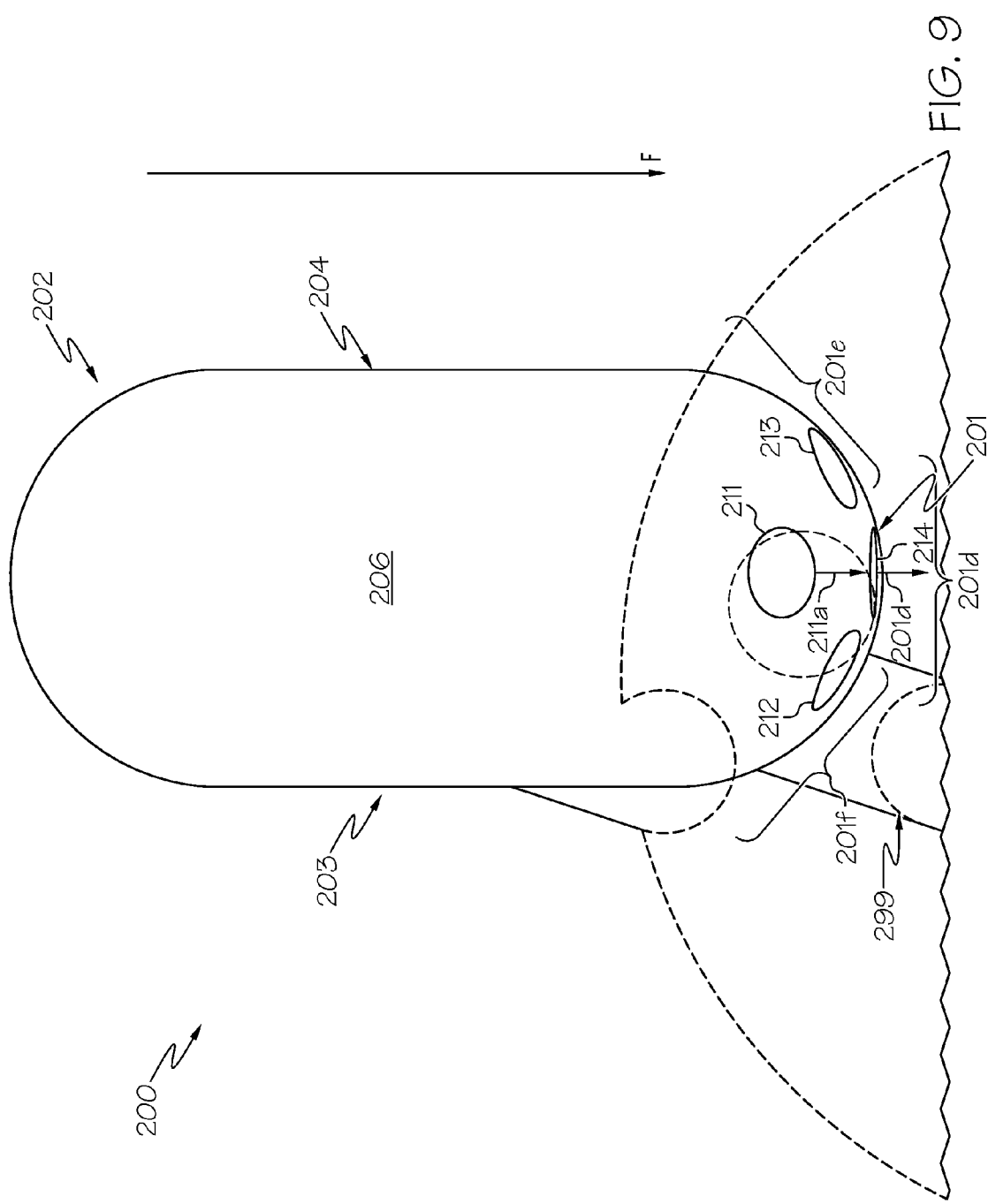

First pressure sensing port 211, in addition to the pitch angle, also defines a "yaw" angle. (The term "yaw angle" is well-known to those having ordinary skill in the art, and the definition thereof provided herein is intended to be commensurate with such understanding). With particular reference to FIGS. 8 and 9, the forward surface further defines fourth, fifth, and sixth portions 201d, 201e, and 201f, which are defined with respect to the "F" directional axis. Portion 201d is generally parallel with respect to the "F" axis, whereas portions 201e and 201f are generally curved with respect to the "F" axis. As pressure sensing port 211 is provided within portion 201d, the normal vector 211α does not deviate from the normal vector 201α with respect to the "F" directional axis. As such, the "yaw" angle of the pressure sensing port 211 is about zero.

Further provided in second portion 201b, or alternatively provided in portion 201a, are second and third pressure sensing ports 212 and 213. Pressure sensing ports 212 and 213 provide a fluid connection with second and third pressure sensing tubes 222 and 223, respectively, which are formed wholly within kernel 200. As second and third pressure sensing ports 212 and 213 may be located within either of the first or second portions 201a, 201b, their respective pitch angles may be either zero (the normal vectors thereof being parallel to normal vector 201α with respect to the "V" directional axis) or they may be less than zero (the normal vectors thereof deviating from the normal vector 201α). In some examples, the pitch angle of second and third pressure sensing ports 212 and 213 may be between about 0° and about 10°, and is preferably between about 0° and about 5°. In one embodiment, the pitch angles of ports 212 and 213 are the same (as in the Figures), whereas in another embodiment they are different.

With regard to the yaw angle, second and third pressure sensing ports 212 and 213 are provided in portions 201f and 201e, respectively, which are curved with respect to the "F" directional axis as noted above. Thus, second pressure sensing port 212 has a yaw angle between about +35° and about +45°. Likewise, the third pressure sensing port 213 has a yaw angle between about −35° and −45°. In one embodiment, the yaw angles of ports 212 and 213 are the same in magnitude (as in the Figures), whereas in another embodiment they are different.

Provided in first portion 201a is a fourth pressure sensing port 214. Fourth pressure sensing port 214 provides a fluid connection with fourth pressure sensing tube 224. As fourth pressure sensing port 214 is located within the first portion 201, the pitch angle thereof is about zero (the normal vector thereof being parallel to normal vector 201α with respect to the "V" directional axis). Further, as the fourth pressure sensing port is located within portion 201d, the yaw angle thereof is about zero (the normal vector thereof being parallel to normal vector 201α with respect to the "F" directional axis). Further, it is generally noted regarding each of the ports 211-214 that such ports are provided as pressure communication tubes within an otherwise smooth and continuous curved/planar surface 201 (as compared to ports provided in the form of extensions that extend outward/forward from surface 201). Such configuration provides for a smoother gas flow within and around the kernel 200.

Turning now to aft surface 202, in some embodiments the surface 202 may be generally curved as shown best in FIG. 9. In other embodiments it may be generally planar or of a more complex shape (i.e., both curved and planar in portions). Likewise, the lateral surfaces 203 and 204 may be generally curved as shown best in FIG. 8. In other embodiments, they may be generally planar. Moreover, as surfaces 202-204 do not include any ports or other openings, they may be contoured for aerodynamic considerations to allow for smooth gas flow therepast.

Figure 3:
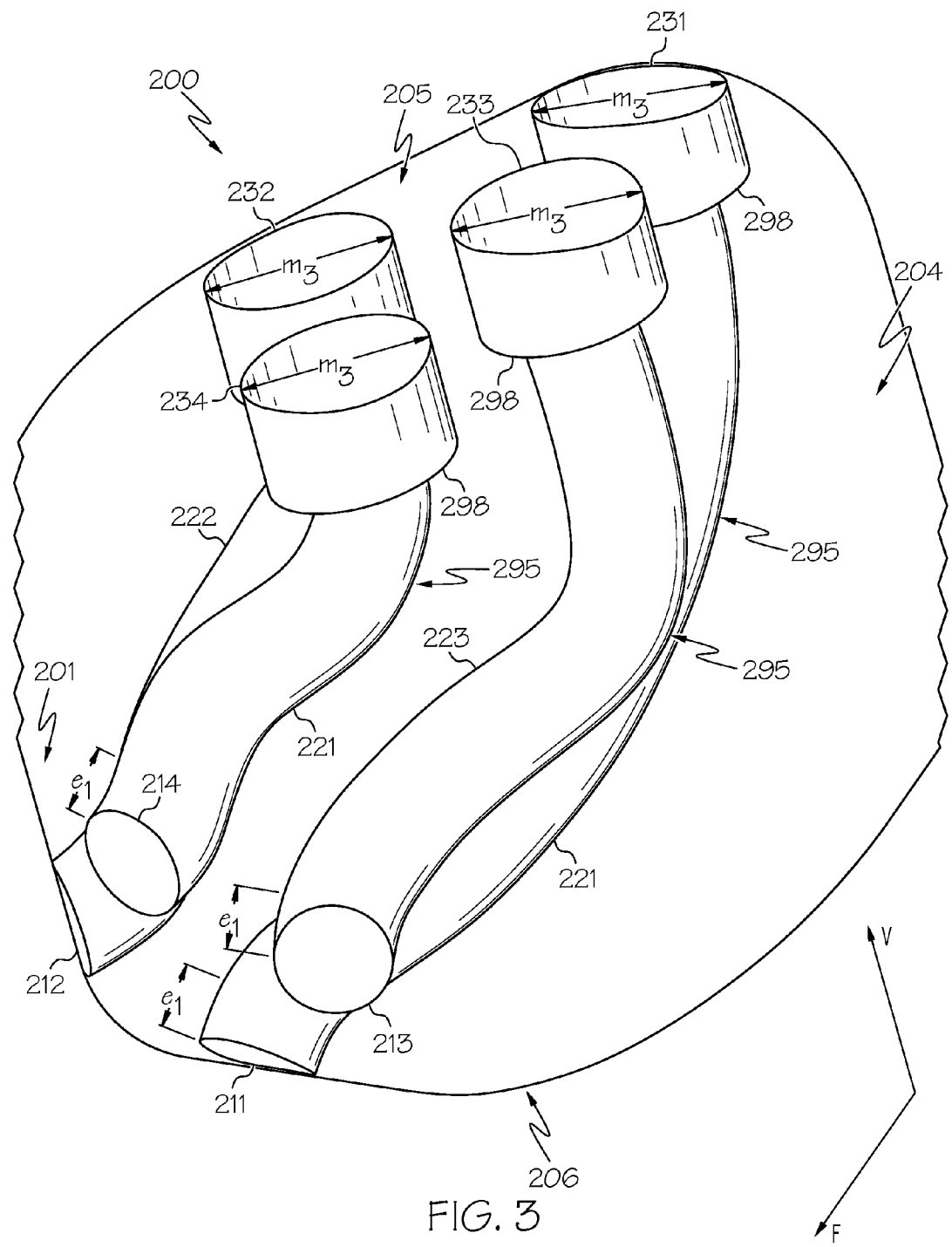

With reference now to upper surface 205, as best shown in FIGS. 3 and 8, upper surface 205 includes four stem ports 231, 232, 233, and 234, which are in fluid connection with pressure sensing tubes 221, 222, 223, and 224, respectively. The normal vectors for each port 231 through 234 are each parallel to the "V" directional axis, as the stem ports 231 through 234 provide the connection point between the stem 299 shown in FIGS. 6 and 9, and the kernel 200. Some portions of upper surface 205 may be curved with respect to either directional axis, whereas others may be curved. To manufacture the completed multi-hole probe, the stem 299 is inserted into the ports 231 through 234, and then the stem 299 is brazed or otherwise metallurgically bonded to ports 231-234.

Figure 5:
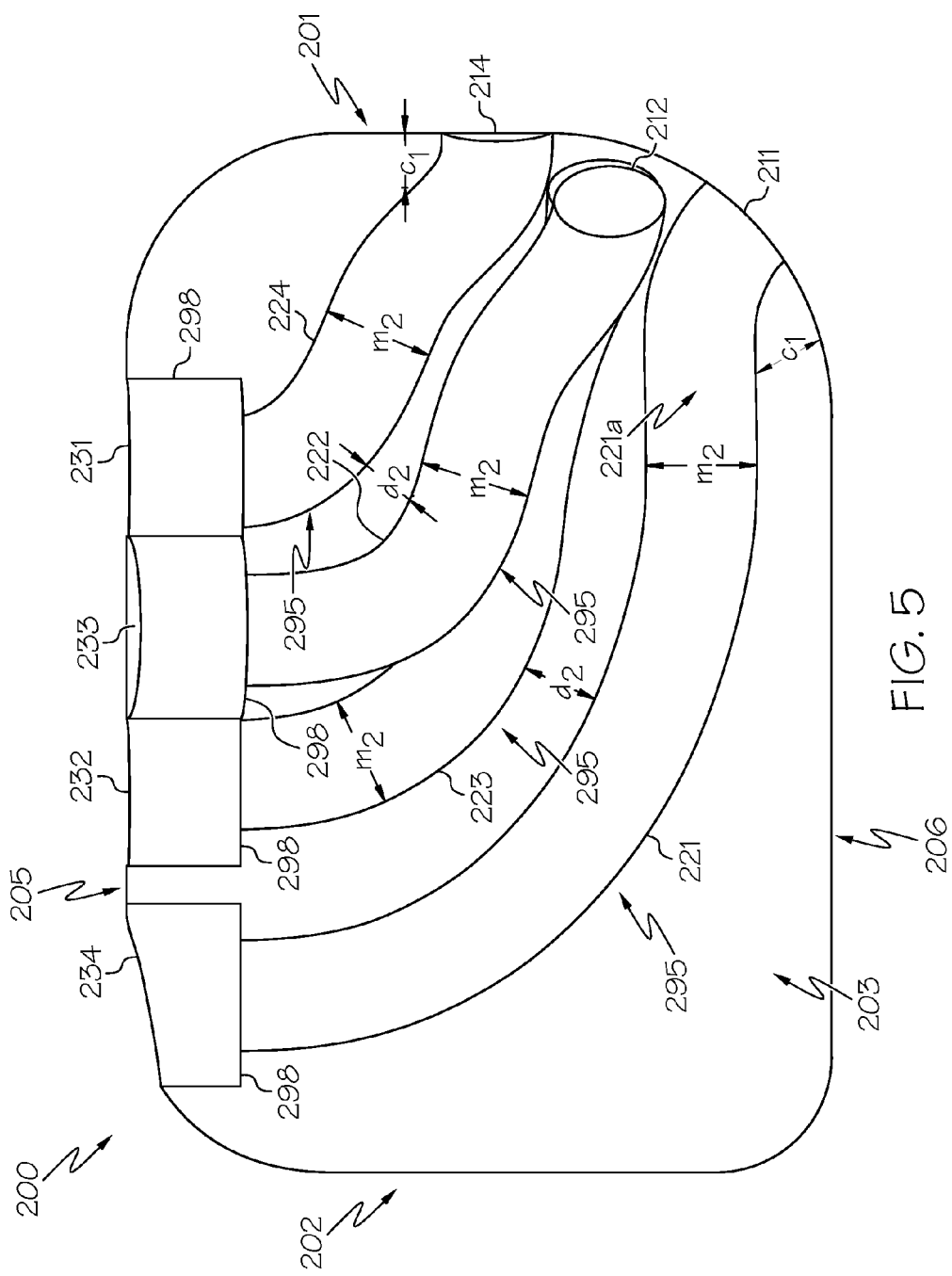
Figure 6:
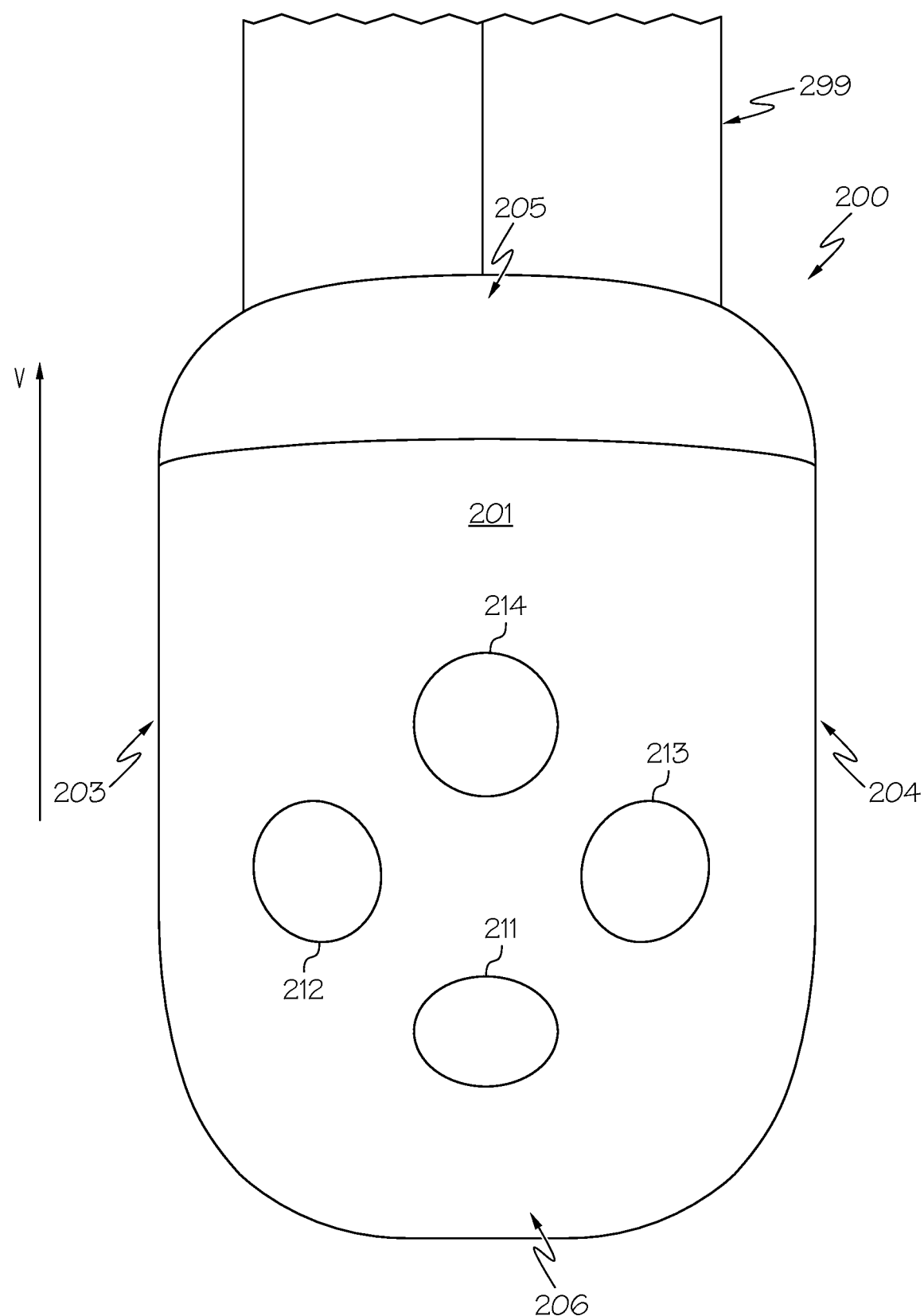

To allow for seamless gas flow from the tubes 221-224 to the stem 299, and further to prevent inadvertent blocking during fabrication, the ports 231-234 are each configured with a "shoulder" portion 298, as best shown in FIG. 5. That is, the diameter of each portion 231-234 is greater that the diameter of each tube 221-224, such that the connection point between the ports and the tubes form a generally flat annular region 298 that serves as an "end-stop" for inserting the stem 299 therewithin. The inner diameter of the stem and the diameter of the tubes 221-224 are configured to be the same, thus the presence of the shoulder portion 298 of the ports 231-234 allows for a smooth and continuous transition between tube and stem, without any changes in diameter that would disrupt the smooth flow of gas therethrough. The length along the "V" directional axis of stem ports 231-234 is generally greater than or equal to about 0.012 inches, such as greater than or equal to about 0.020 inches. In one embodiment, the range is from about 0.015 inches to about 0.025 inches. The dimensions of the ports and tubes are discussed in greater detail below.

Lower surface 206, as illustrated best in FIG. 9, is provided in either a planar or a curved configuration (or portions of both). As surface 206 does not include any ports or other openings, it may be contoured for aerodynamic considerations to allow for smooth gas flow therepast.

Reference will now be made to the sizing, spacing, and configuration of pressure sensing ports 211-214, tubes 221-224, and stem ports 231-234. As noted above, to allow for the greatest sampling of regions in a small-class gas turbine engine, it is preferable to provide the kernel 200 as small as possible. However, due to the manufacturing constraints of additive manufacturing, for example DMLS, certain minimum dimensions may be observed in order to prevent manufacturing defects. For example, current DMLS processes allow for feature sizes that are greater than or equal to about 0.012 inches, preferably greater than or equal to about 0.020 inches. Thus, the spacing between ports, the spacing between tubes, the spacing between tubes and the periphery of the kernel, and the dimensions of the ports/tubes (e.g., the diameter), may each be equal to or greater than about 0.012 inches, for example equal to or greater than about 0.020 inches. In one embodiment, the range is from about 0.015 inches to about 0.025 inches.

For example, as shown in FIG. 2, a distance d1 is defined between neighboring pressure sensing ports 211-214. Such distance, in an embodiment, is provided at a magnitude of greater than or equal to 0.012 inches, for example greater than or equal to 0.020 inches. In one embodiment, the range is from about 0.015 inches to about 0.025 inches. While FIG. 2 shows all distances between neighboring ports 211-214 being the same (d1), it will be appreciated that different distances may be used in different configurations, as long as the minimum spacing is observed.

Figure 7:
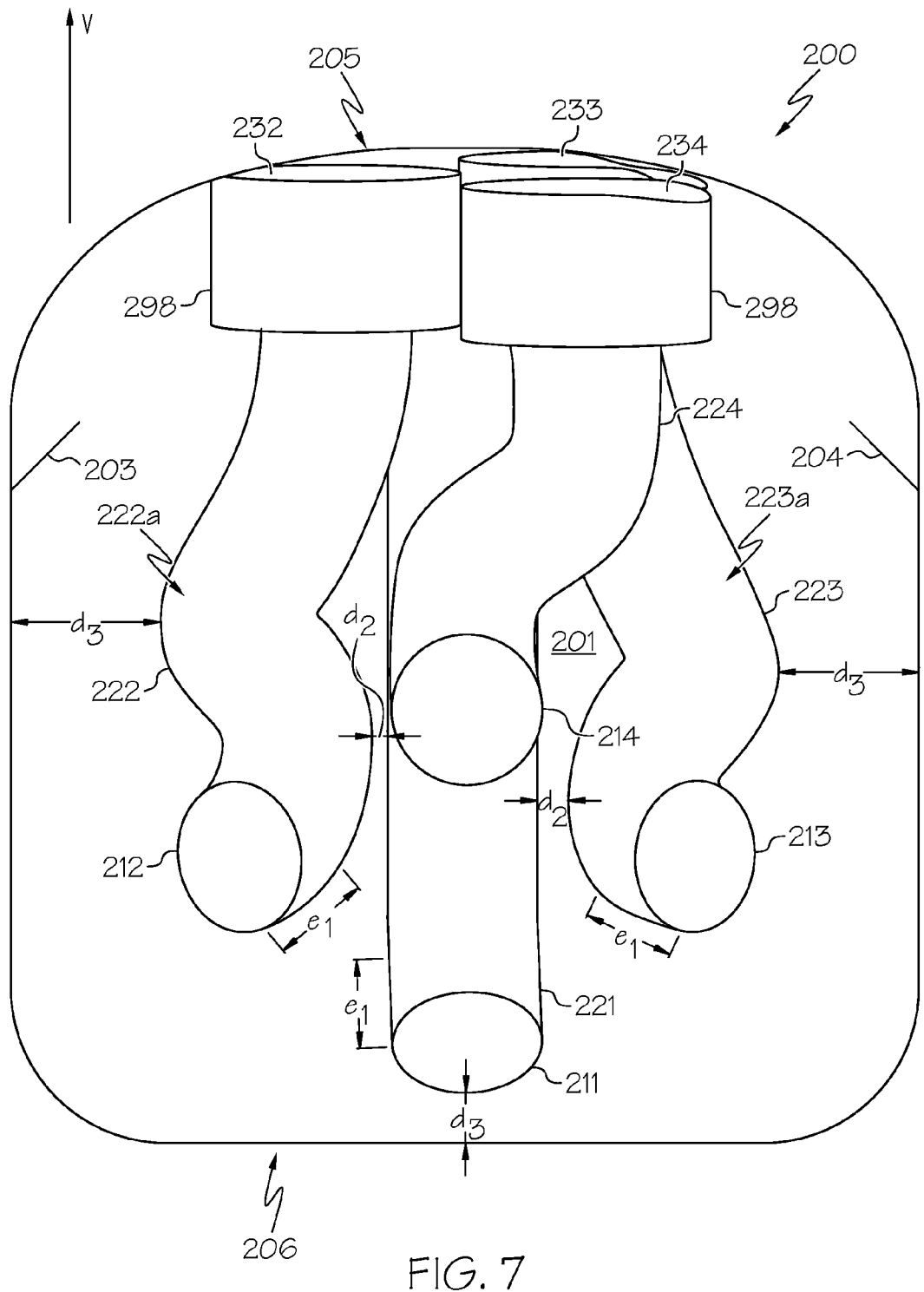

By way of further example, as shown in FIGS. 5 and 7, a distance d2 is defined as the nearest point of approach of neighboring tubes 221-224. Such distance, in an embodiment, is provided at a magnitude of greater than or equal to 0.012 inches, for example greater than or equal to 0.020 inches. In one embodiment, the range is from about 0.015 inches to about 0.025 inches. While FIGS. 5 and 7 show all nearest approach distances between neighboring tubes 221-224 being the same (d2), it will be appreciated that different distances may be used in different configurations, as long as the minimum spacing is observed.

By way of further example, as shown in FIG. 7, a distance d3 is defined as the minimum spacing between a tube and the periphery (i.e., exterior surfaces 201-206) of the kernel 200. Such distance, in an embodiment, is provided at a magnitude of greater than or equal to 0.012 inches, for example greater than or equal to 0.020 inches. In one embodiment, the range is from about 0.015 inches to about 0.025 inches. While FIG. 7 shows all distances between tubes and exterior surfaces being the same (d3), it will be appreciated that different distances may be used in different configurations, as long as the minimum spacing is observed.

By way of still further example, as shown in FIG. 8, a distance d4 is defined between neighboring stem ports 231-234. Such distance, in an embodiment, is provided at a magnitude of greater than or equal to 0.012 inches, for example greater than or equal to 0.020 inches. In one embodiment, the range is from about 0.015 inches to about 0.025 inches. While FIG. 8 shows all distances between neighboring ports 231-234 being the same (d4), it will be appreciated that different distances may be used in different configurations, as long as the minimum spacing is observed.

With reference now to the diameters m1 of the pressure sensing ports 211-214, as shown in FIG. 2, such diameter m1, in an embodiment, is provided at a magnitude of greater than or equal to 0.012 inches, for example greater than or equal to 0.020 inches. In one embodiment, the range is from about 0.015 inches to about 0.025 inches. While FIG. 2 shows all diameters m1 being the same, it will be appreciated that different diameters may be used in different configurations, as long as the minimum sizing is observed.

With reference now to the diameters m2 of the tubes 221-224, as shown in FIG. 5, such diameter m2, in an embodiment, is provided at a magnitude of greater than or equal to 0.012 inches, for example greater than or equal to 0.020 inches. In one embodiment, the range is from about 0.015 inches to about 0.025 inches. While FIG. 5 shows all diameters m2 being the same, it will be appreciated that different diameters may be used in different configurations, as long as the minimum sizing is observed. Further, while FIG. 5 shows the diameter being generally continuous along the length of the tubes for purposes of smoothness of flow, as is preferred, in other embodiments the diameters m2 need not necessarily be continuous, again as long as the minimum sizing is observed. Here again, it is noted that in the Figures, a generally circular cross section is shown having a diameter. However, in other embodiments, the cross-section of the tubes may be non-circular, such as oval, ovoid, or elliptical, so as to further improve packing efficiency. Such differing cross-sections fall within the scope of the present disclosure, provide their minimum dimensions adhere to the specifications provided herein.

With reference now to the diameters m3 of the stem ports 231-234, as shown in FIG. 3, such diameter m3, in an embodiment, is provided at a magnitude of greater than or equal to 0.012 inches, for example greater than or equal to 0.020 inches. In one embodiment, the range is from about 0.015 inches to about 0.025 inches. However, to allow for the shoulder regions 298 to be formed, the diameter m3 will also typically be about 0.002 inches to about 0.005 inches greater in diameter than diameter m2 of the tubes 221-224. While FIG. 3 shows all diameters m3 being the same, it will be appreciated that different diameters may be used in different configurations, as long as the minimum sizing is observed.

As further noted above, in order to maintain the kernel 200 desirably small, an optimum tube path may be provided for each tube 221-224 between the respective pressure sensing port 211-214 and the respective stem port 231-234. The optimum tube path is one that (1) maintains as close to the minimum spacing as possible between the tubes and from the periphery of the kernel, (2) maintains a sufficiently long yaw/pitch entry angle at the pressure sensing ports 211-214, and (3) changes the gas flow direction from generally parallel with the "F" directional axis to generally parallel with the "V"

directional axis for entry into the stem 299. FIGS. 3, 5, 7, and 8 best show the tube paths, in accordance with an exemplary embodiment.

Regarding maintaining the minimum spacing, such requirements have been previously discussed above, and need not be repeated herein. Regarding maintaining a sufficiently long entry angle with respect to yaw and pitch, it is typically desirable to maintain such angle for a distance of greater than or equal to about ½ diameter of the pressure sensing port, such as greater than or equal to 1 full diameter of the pressure sensing port. In FIGS. 3, 5, 7, and 8, such initial entry distance is marked by e1, and as noted, typically is greater than or equal to about 0.006 inches, such as greater than or equal to about 0.010 inches. In one embodiment, the range is from about 0.008 inches to about 0.012 inches. While the Figures show all diameters distances e1 being the same, it will be appreciated that different distances may be used in different configurations.

Regarding changing the gas flow direction, it will further be observed that each tube 221-224, as shown in FIGS. 3 and 5, includes a bend 295 (or alternatively a series of two or more bends) that redirects the gas flow path from generally parallel with the "F" directional axis to generally parallel with the "V" directional axis for entry into the stem 299.

Greater description regarding the path of each pressure sensing tube 221-224 between respective ports is now provided for purposes of illustration. Other paths that correspond with the above-noted requirements are likewise within the scope of the present disclosure. Regarding the path of tube 221, the tube maintains its aforementioned pitch and yaw for the distance e1, and thereafter makes a first bend 221a (shown in FIG. 5) in the "V" axis to maintain minimum spacing with lower surface 206. Thereafter, the tube 221 makes its upward bend 295 to meet with port 231. As shown best in FIG. 7, tube 221 does not bend laterally along its path.

Regarding the path of tube 222, the tube maintains its aforementioned pitch and yaw for the distance e1, and thereafter makes a first bend 222a (shown in FIG. 7) that is both lateral toward surface 203 and upward to maintain minimum spacing with tube 221. Thereafter, the tube 222 makes its upward bend 295, which in this instance further includes an inward component to maintain spacing with the curvature of surfaces 203/205, and further to meet with port 232.

Regarding the path of tube 223, the tube maintains its aforementioned pitch and yaw for the distance e1, and thereafter makes a first bend 223a (shown in FIG. 7) that is both lateral toward surface 204 and upward to maintain minimum spacing with tube 221. Thereafter, the tube 222 makes its upward bend 295, which in this instance further includes an inward component to maintain spacing with the curvature of surfaces 204/205, and further to meet with port 233.

Further, regarding the path of tube 224, the tube maintains its aforementioned pitch and yaw for the distance e1, and thereafter makes a first bend 224a (shown in FIG. 5) in a direction that is both upward (in the "V" axis) and lateral toward surface 204. Thereafter, the tube 222 makes its upward bend 295, which in this instance further includes an inward component to maintain spacing with the curvature of surfaces 204/205, and further to meet with port 234.

As a result of these described tube paths, tube 221 connects pressure sensing port 211, which is the lowest port with respect to the "V" directional axis with stem port 231, which is the furthest aft port. Likewise, tube 224 connects pressure sensing port 214, which is the highest port with respect to the "V" directional axis with stem port 234, which is the further forward port. Ports 212/232 and 213/233 maintain the relative lateral and forward positioning, except that port 232 is provided further forward than port 233 (despite ports' 212 and 213 equal vertical position) to maintain minimum spacing along surface 205 due to the larger diameters m3 as compared to m1. Further, as a result of these described tube paths, the lateral dimension of the kernel 200 may be less than or equal to about 0.1 inches (such as less than or equal to about 0.08 inches), the vertical ("V" axis) dimension thereof may be less than or equal to about 0.2 inches, and the forward ("F" axis) dimension thereof may also be less than or equal to about 0.2 inches.

Figure 10:
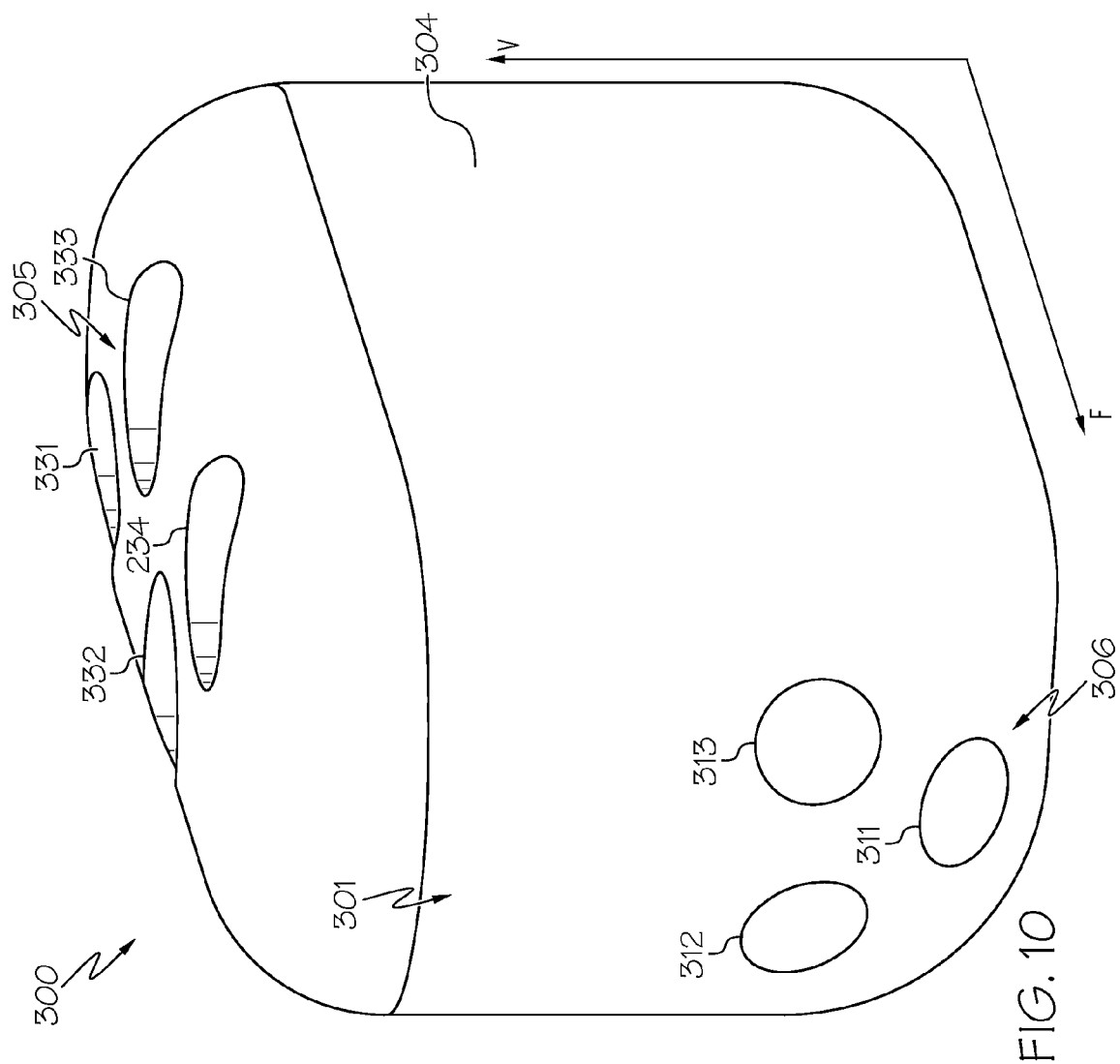
FIG. 10 depicts a perspective view of a multi-hole probe in accordance with another exemplary embodiment of the present disclosure.
Figure 11:
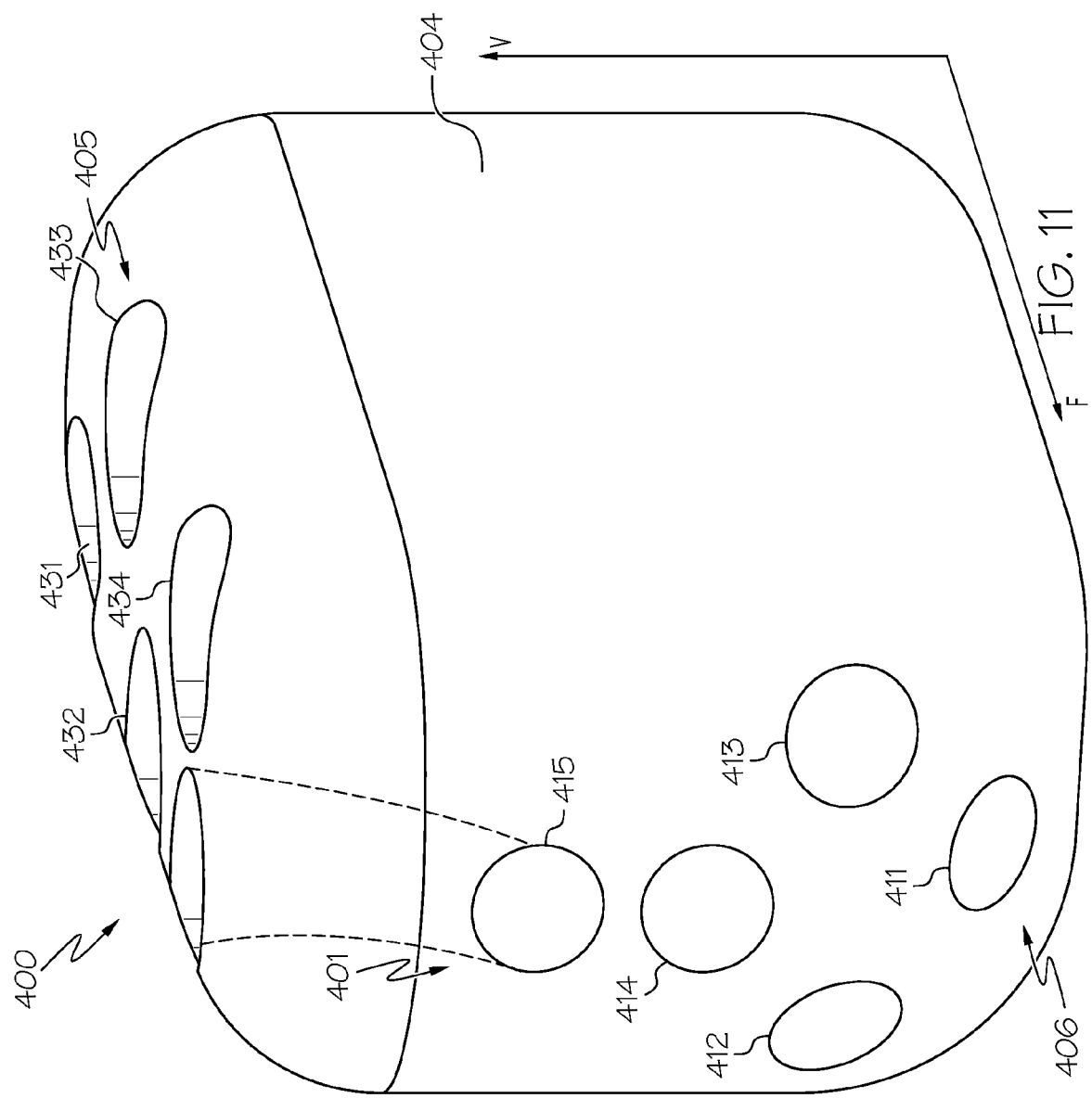
FIG. 11 depicts a perspective view of a multi-hole probe in accordance with yet another exemplary embodiment of the present disclosure.

Alternative embodiments of the present disclosure are provided in FIGS. 10 and 11. FIG. 10 illustrates and embodiment wherein only 3 ports 311, 312, and 313 (and 331, 332, and 333) are present. This embodiment allows for a smaller kernel 300, but sacrifices some accuracy due to the fact that it has one fewer measurement point. In this embodiment, ports 312 and 313 are moved closer together laterally (and slightly higher) to maintain optimal spacing with themselves and port 311. Further, surfaces 301 and 305 may be smaller due to less surface area needed for one fewer port on each. All other aspects of kernel 300 remain as described above with regard to kernel 200, with reference numerals being incremented by 100 for ease of comparison among embodiments.

FIG. 11 illustrates an embodiment wherein a fifth pressure sensing port 415 and a fifth stem port 435 is added for measuring temperature. Instead of fluidly passing to a pressure transducer, the portion of the stem that connects with stem port 435 directs the gas to a thermocouple for determining a temperature of the flow. As shown, along surface 401, the pressure sensing port 415 is added directly above the pressure sensing port 414. The pitch and yaw angles thereof, like port 414, are about zero. The stem port 435 is provided forward of port 434, and laterally in-line with ports 431 and 432. Further, surfaces 401 and 405 may be larger due to a greater surface area needed for one more port on each. All other aspects of kernel 400 remain as described above with regard to kernel 200, with reference numerals being incremented by a further 100 for ease of comparison among embodiments.

In general, it is expected that, based on the teachings herein, a person having ordinary skill in the art will be able to modify the multi-hole probe kernel designs as above to conform for use in a wide variety of applications, as the selection of size, shape, etc. of working components is generally considered to be within the level of skill of a person having ordinary skill in the art. As such, the various possible implementations of the multi-hole probes should not be considered limited to any of the embodiments presented herein.

It will be appreciated that certain features of the presently described multi-hole probes would be prohibitively expensive and/or impossible to manufacture using conventional manufacturing techniques. These include the contoured or curved inlets and tubes and the varying wall thickness features, among others. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials.

Figure 12:
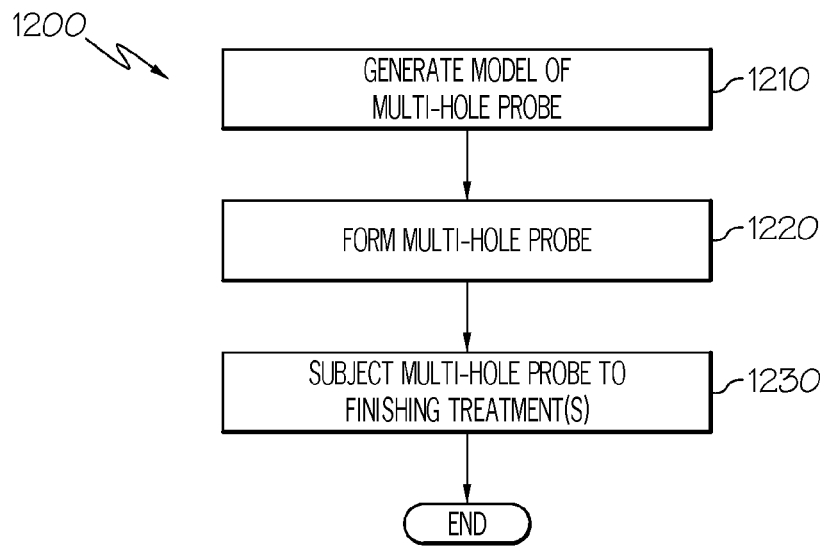
FIG. 12 is a flow diagram illustrating steps in a method of manufacturing a multi-hole probe in accordance with embodiments of the present disclosure.

FIG. 12 is a flowchart illustrating a method 1200 for manufacturing a portion of a multi-hole probe, such as the kernel 200 as shown in FIG. 2, in accordance with an exemplary embodiment using, in whole or in part, additive manufacturing techniques. In the discussion that follows, "the multi-hole probe" will be referred to generically as representative of any or all portions of a multi-hole probe in accordance with the present disclosure, including particularly the kernel or tip portion thereof, that can be made using additive manufacturing techniques. Of course, as discussed above, various components of the multi-hole probe, whether made by additive manufacturing techniques or otherwise, may be brazed or otherwise joined together to form a completed multi-hole probe.

In a first step 1210, a model, such as a design model, of the multi-hole probe may be defined in any suitable manner. For example, the model may be designed with computer aided design (CAD) software and may include three-dimensional ("3D") numeric coordinates of the entire configuration of the multi-hole probe including both external and internal surfaces. In one exemplary embodiment, the model may include a number of successive two-dimensional ("2D") cross-sectional slices that together form the 3D component.

In step 1220 of the method 1200, the multi-hole probe is formed according to the model of step 1210. In one exemplary embodiment, a portion of the multi-hole probe is formed using a rapid prototyping or additive layer manufacturing process. In other embodiments, the entire multi-hole probe is formed using a rapid prototyping or additive layer manufacturing process.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the multi-hole probe in step 1220. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above.

As such, in one exemplary embodiment, step 1220 is performed with DMLF techniques to form the multi-hole probe. However, prior to a discussion of the subsequent method steps, reference is made to FIG. 13, which is a schematic view of a DMLF system 1300 for manufacturing the multi-hole probe, for example the kernel 200 thereof, in accordance with an exemplary embodiment.

Figure 13:
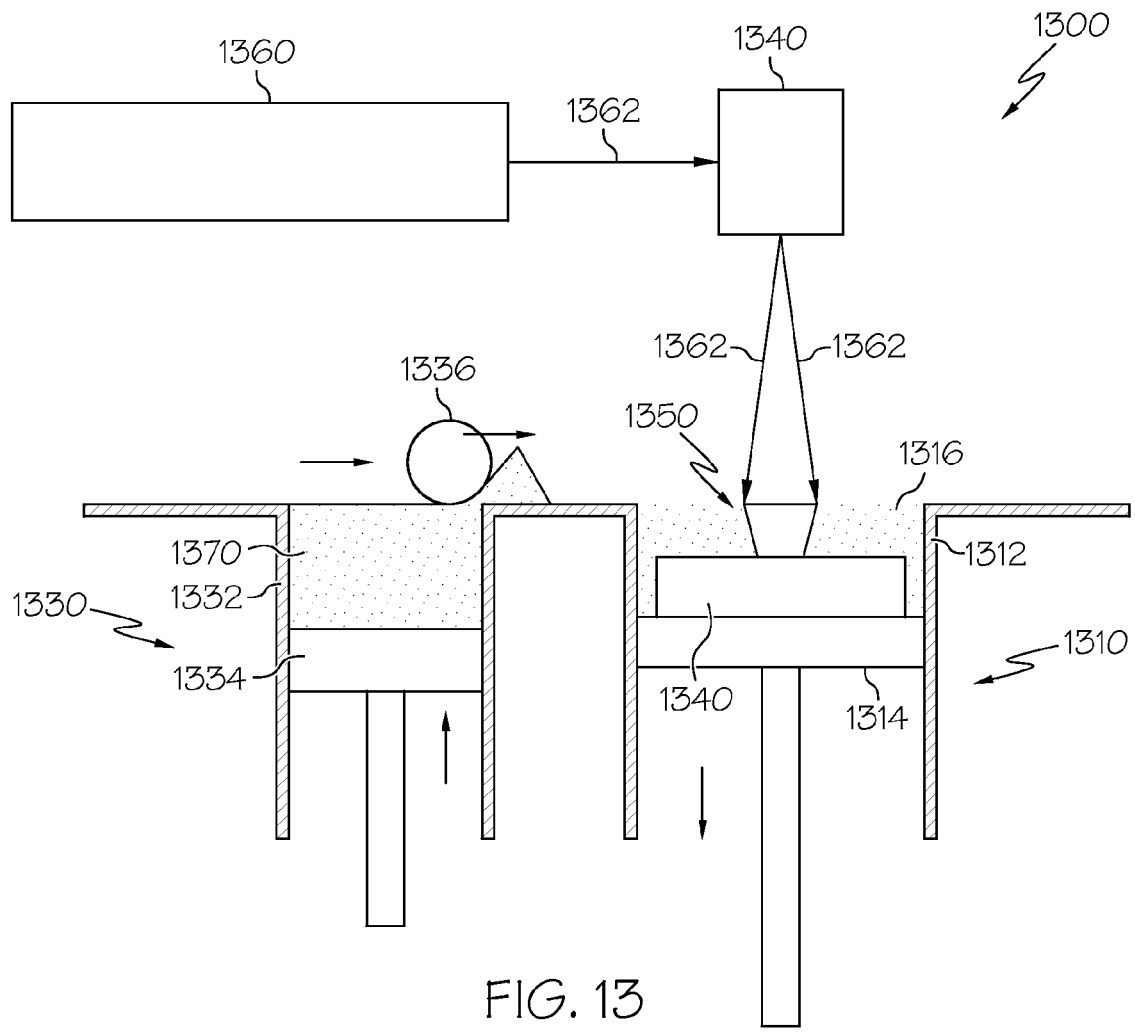
FIG. 13 is an exemplary additive manufacturing system suitable for use in manufacturing multi-hole probes in accordance with the present disclosure.

Referring to FIG. 13, the system 1300 includes a fabrication device 1310, a powder delivery device 1330, a scanner 1340, and a laser 1360 that function to manufacture the article 1350 (e.g., the multi-hole probe, or a component thereof) with build material 1370. The fabrication device 1310 includes a build container 1312 with a fabrication support 1314 on which the article 1350 is formed and supported. The fabrication support 1314 is movable within the build container 1312 in a vertical direction and is adjusted in such a way to define a working plane 1316. The delivery device 1330 includes a powder chamber 1332 with a delivery support 1334 that supports the build material 1370 and is also movable in the vertical direction. The delivery device 1330 further includes a roller or wiper 1336 that transfers build material 1370 from the delivery device 1330 to the fabrication device 1310.

During operation, a base block 1340 may be installed on the fabrication support 1314. The fabrication support 1314 is lowered and the delivery support 1334 is raised. The roller or wiper 1336 scrapes or otherwise pushes a portion of the build material 1370 from the delivery device 1330 to form the working plane 1316 in the fabrication device 1310. The laser 1360 emits a laser beam 1362, which is directed by the scanner 1340 onto the build material 1370 in the working plane 1316 to selectively fuse the build material 1370 into a cross-sectional layer of the article 1350 according to the design. More specifically, the speed, position, and other operating parameters of the laser beam 1362 are controlled to selectively fuse the powder of the build material 1370 into larger structures by rapidly melting the powder particles that may melt or diffuse into the solid structure below, and subsequently, cool and re-solidify. As such, based on the control of the laser beam 1362, each layer of build material 1370 may include unfused and fused build material 1370 that respectively corresponds to the cross-sectional passages and walls that form the article 1350. In general, the laser beam 1362 is relatively low power to selectively fuse the individual layer of build material 1370. As an example, the laser beam 1362 may have a power of approximately 50 to 500 Watts, although any suitable power may be provided.

Upon completion of a respective layer, the fabrication support 1314 is lowered and the delivery support 1334 is raised. Typically, the fabrication support 1314, and thus the article 1350, does not move in a horizontal plane during this step. The roller or wiper 1336 again pushes a portion of the build material 1370 from the delivery device 1330 to form an additional layer of build material 1370 on the working plane 1316 of the fabrication device 1310. The laser beam 1362 is movably supported relative to the article 1350 and is again controlled to selectively form another cross-sectional layer. As such, the article 1350 is positioned in a bed of build material 1370 as the successive layers are formed such that the unfused and fused material supports subsequent layers. This process is continued according to the modeled design as successive cross-sectional layers are formed into the completed desired portion, e.g., the multi-hole probe of step 1220.

The delivery of build material 1370 and movement of the article 1350 in the vertical direction are relatively constant and only the movement of the laser beam 1362 is selectively controlled to provide a simpler and more precise implementation. The localized fusing of the build material 1370 enables more precise placement of fused material to reduce or eliminate the occurrence of over-deposition of material and excessive energy or heat, which may otherwise result in cracking or distortion. The unused and unfused build material 1370 may be reused, thereby further reducing scrap.

Any suitable laser and laser parameters may be used, including considerations with respect to power, laser beam spot size, and scanning velocity. As a general matter, the build material 1370 may be formed by any suitable powder, including powdered metals, such as a stainless steel powder, and alloys and super alloy materials, such as nickel-based or cobalt superalloys. In one exemplary embodiment, the build material 1370 is a high temperature nickel base super alloy such as IN718. In other embodiments, MAR-M-247, IN738, titanium, aluminum, titanium-aluminide, or other suitable alloys may be employed. In general, the powder build material 1370 may be selected for enhanced strength, durability, and useful life, particularly at high temperatures, although as described below, the powder build material 1370 may also be selected based on the intended function of the area being formed.

Returning to FIG. 12, at the completion of step 1220, the article 1350, i.e., the multi-hole probe, is removed from the additive manufacturing system (e.g., from the DMLF system 1300). In optional step 1230, the multi-hole probe formed in step 1220 may undergo finishing treatments. Finishing treatments may include, for example, aging, annealing, quenching, peening, polishing, hot isostatic pressing (HIP), or coatings.

The method 1200 has been discussed above with reference to the formation of a single multi-hole probe. However, in one exemplary embodiment of the method 1200, more than one multi-hole probe may be manufactured simultaneously. Unless otherwise noted, method 1200 in this embodiment proceeds as discussed above. In this embodiment of the method 1200, the articles are formed on a common base block (e.g., base block 1340) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

If necessary, the multi-hole probe may be machined to final specifications. The machining techniques may include, for example, brazing as noted above to connect the kernel 200 to the stem portion. In further steps (not shown), the multi-hole probe may be used for testing and measuring gas flow in a gas turbine engine, as illustrated in FIG. 1. For example, the multi-hole probe may be calibrated by exposing the probe to a range of known gas velocities and establishing an observed pressure/velocity calibration curve, as is well-known to those having ordinary skill in the art.

Further, it is foreseeable within the scope of the present disclosure that manufacturing technologies may improve, thus allowing minimum dimensions as described herein of less than 0.012 inches. As such, if and when such technologies become available, such technologies will be understood to fall within scope of the present disclosure.

Accordingly, a multi-hole pressure probe has been disclosed that provides optimal packing efficiency for the internal pneumatic tubes. The use of CAD also makes it quick and easy to make slight adjustments to the probe design to suit a specific application. The complicated internal structures of the probe tip, heretofore unknown in the art, are produced with DMLS so that the probe can be produced accurately and inexpensively.

While at least one exemplary embodiment has been presented in the foregoing detailed description, it should be appreciated that a vast number of variations exist. It should also be appreciated that the exemplary embodiments of the multi-hole probe are only examples, and are not intended to limit the scope, applicability, or configuration of the invention in any way. Rather, the foregoing detailed description will provide those skilled in the art with a convenient road map for implementing an exemplary embodiment of the inventive multi-hole probe. It is understood that various changes may be made in the function and arrangement of elements described in an exemplary embodiment without departing from the scope of the invention as set forth in the appended claims.

What is claimed is:

1. A multi-hole probe having a kernel comprising:
   a forward surface comprising at least a first, second, and third pressure sensing ports, wherein the first pressure sensing port comprises a pitch angle of about −10° to about −45° and a yaw angle of about 0°, wherein the second pressure sensing port comprises a pitch angle of about 0° to about −10° and a yaw angle of about −35° to about −45°, wherein the third pressure sensing port comprises a pitch angle of about 0° to about −10° and a yaw angle of about +35° to about +45°, and wherein the first, second, and third pressure sensing ports are spaced apart from one another by a distance of greater than or equal to about 0.012 inches;
   an upper surface generally orthogonal to the forward surface and comprising at least a first, second, and third stem ports, wherein the first, second, and third stem ports are spaced apart from one another by a distance of greater than or equal to about 0.012 inches; and
   first, second, and third tubes running between and providing a fluid connection with the first, second, and third pressure sensing ports and the first, second, and third stem ports, respectively, wherein the first, second, and third tubes are contained fully within the kernel, wherein the first, second, and third tubes are each configured to redirect a gas flow pressure from a first direction to a second direction that is approximately orthogonal to the first direction, and wherein the kernel is sized at less than or equal to about 0.10 inches across in a third direction that is approximately orthogonal to both the first and second directions.

2. The multi-hole probe kernel of claim 1, further comprising:
   a fourth pressure sensing port, wherein the fourth pressure sensing port comprises a pitch angle of about 0° and a yaw angle of about 0°;
   a fourth stem port; and
   a fourth tube running between and providing a fluid connection with the fourth pressure sensing port and the fourth stem port, wherein the fourth stem port connects with a portion of a probe stem that directs the gas flow pressure to a pressure transducer for measuring a pressure of the gas stream.

3. The multi-hole probe kernel of claim 2, further comprising:
   a fifth pressure sensing port, wherein the fifth pressure sensing port comprises a pitch angle of about 0° and a yaw angle of about 0°;
   a fifth stem port; and
   a fourth tube running between and providing a fluid connection with the fourth pressure sensing port and the fourth stem port, wherein the fifth stem port connects with a portion of a probe stem that directs the gas flow pressure to a thermocouple for measuring a temperature of the gas stream.

4. The multi-hole probe kernel of claim 3, wherein the first, second, and third stem ports connect with a portion of a probe stem that directs the flowing gas stream to a plurality of pressure transducers for measuring the pressure of the gas stream.

5. The multi-hole probe kernel of claim 1, wherein each of the first, second, and third gas pressure sensing ports has a diameter that is greater than or equal to about 0.012 inches.

6. The multi-hole probe kernel of claim 5, wherein each of the first, second, and third tubes has a diameter that is greater than or equal to about 0.012 inches.

7. The multi-hole probe kernel of claim 6, wherein each of the first, second, and third stem ports has a diameter that is greater than the diameter of the first, second, and third tubes.

8. The multi-hole probe kernel of claim 1, wherein the first, second, and third tubes maintains the yaw and pitch of its respective first, second, and third pressure sensing ports for a distance downstream from such port that is equal to or greater than half a diameter of such port.

9. The multi-hole probe kernel of claim 1, wherein the tubes are curved such that each tube maintains a minimum approach distance from all other tubes of equal to or greater than 0.012 inches.

10. The multi-hole probe kernel of claim 1, wherein each of the first, second, and third stem ports comprises an annular shoulder portion.

11. A method of manufacturing a multi-hole probe comprising the steps of:
provideing a three-dimensional design for a probe kernel, the design comprising:
a forward surface comprising at least a first, second, and third pressure sensing ports, wherein the first pressure sensing port comprises a pitch angle of about −10° to about −45° and a yaw angle of about 0°, wherein the second pressure sensing port comprises a pitch angle of about 0° to about −10° and a yaw angle of about −35° to about −45°, wherein the third pressure sensing port comprises a pitch angle of about 0° to about −10° and a yaw angle of about +35° to about +45°, and wherein the first, second, and third pressure sensing ports are spaced apart from one another by a distance of greater than or equal to about 0.012 inches;
an upper surface generally orthogonal to the forward surface and comprising at least a first, second, and third stem ports, wherein the first, second, and third stem ports are spaced apart from one another by a distance of greater than or equal to about 0.012 inches; and
first, second, and third tubes running between and providing a fluid connection with the first, second, and third pressure sensing ports and the first, second, and third stem ports, respectively, wherein the first, second, and third tubes are contained fully within the kernel, wherein the kernel comprises a lateral dimension that is less than or equal to about 0.10 inches;
providing the three-dimensional design to an additive manufacturing system; and
forming the kernel, based on the three-dimensional design, using the additive manufacturing system, wherein forming the kernel comprises directing a high-energy beam onto a build material in successive layers so as to fuse such layers into the three-dimensional design.

12. The method of claim 11, further comprising the step of subjecting the formed kernel to a finishing treatment.

13. The method of claim 11, further comprising calibrating the formed kernel.

14. The method of claim 11, wherein forming the kernel using the additive manufacturing system comprises forming the kernel using a direct metal laser fusion system.

15. The method of claim 14, wherein forming the kernel using the additive manufacturing system comprises forming the kernel using a direct metal laser sintering system.

16. The method of claim 11, wherein providing the three-dimensional design comprises generating the three-dimensional design using a computer-aided design system.

17. The method of claim 11, further comprising attaching a probe stem to the formed kernel.

18. The method of claim 17, wherein attaching the probe stem to the kernel comprises brazing the probe stem to the kernel.

19. The method of claim 18, wherein attaching the probe stem comprises attaching a probe stem that comprises a plurality of pressure transducers.

20. A multi-hole probe having a kernel comprising:
a forward surface comprising at least a first, second, and third pressure sensing ports, wherein the first pressure sensing port comprises a pitch angle of about −10° to about −45° and a yaw angle of about 0°, wherein the second pressure sensing port comprises a pitch angle of about 0° to about −10° and a yaw angle of about −35° to about −45°, wherein the third pressure sensing port comprises a pitch angle of about 0° to about −10° and a yaw angle of about +35° to about +45°, and wherein the first, second, and third pressure sensing ports are spaced apart from one another by a distance of greater than or equal to about 0.012 inches;
an upper surface generally orthogonal to the forward surface and comprising at least a first, second, and third stem ports, wherein the first, second, and third stem ports are spaced apart from one another by a distance of greater than or equal to about 0.012 inches; and
first, second, and third tubes running between and providing a fluid connection with the first, second, and third pressure sensing ports and the first, second, and third stem ports, respectively, wherein the first, second, and third tubes are contained fully within the kernel, wherein each of the first, second, and third tubes comprise a non-circular cross-section, wherein the first, second, and third tubes are each configured to redirect a gas flow pressure from a first direction to a second direction that is approximately orthogonal to the first direction, and wherein the kernel is sized at less than or equal to about 0.10 inches across in a third direction that is approximately orthogonal to both the first and second directions.

* * * * *